United States Patent
Bordener

[11] Patent Number: 6,000,673
[45] Date of Patent: Dec. 14, 1999

[54] MOLD ASSEMBLY FOR PRODUCING A COUNTERTOP EXHIBITING AN INTEGRALLY FORMED SINK BOWL AND BUILT-UP EDGE AND METHOD FOR PRODUCING THE SAME

[75] Inventor: Robert Bordener, Bloomfield Hills, Mich.

[73] Assignee: Talon Surfaces LLC, Troy, Mich.

[21] Appl. No.: 08/928,281

[22] Filed: Sep. 12, 1997

[51] Int. Cl.⁶ .................................................. B29C 39/02
[52] U.S. Cl. .......................... 249/53 R; 249/83; 249/139; 249/144; 249/158; 249/160; 249/170; 264/255
[58] Field of Search .................... 249/53 R, 83, 249/139, 144, 155, 158, 160, 170; 264/255

[56] References Cited

U.S. PATENT DOCUMENTS

| | | |
|---|---|---|
| 3,736,201 | 5/1973 | Shoichi Teraoka . |
| 4,086,318 | 4/1978 | Garasi et al. . |
| 4,205,028 | 5/1980 | Brueggemann et al. . |
| 4,209,862 | 7/1980 | Gortes-Garza . |
| 5,628,949 | 5/1997 | Bordener . |
| 5,683,638 | 11/1997 | Crigler et al. . |

*Primary Examiner*—James P. Mackey
*Attorney, Agent, or Firm*—Gifford, Krass, Groh, Sprinkle, Anderson & Citkowski, P.C.

[57] ABSTRACT

A mold assembly and method for producing a resin based countertop having an integrally formed sink bowl and a built-up edge. An elongate base is defined by a central surface area which is bounded by a plurality of interconnecting and elevated sides to establish a mold enclosure which is a negative shape of the countertop to be produced. A template is settable upon the elongate base and movable in a selected longitudinal direction so that an opening formed in the template is positioned in overlaying fashion at a desired location along the central area. A first sink bowl pattern is placeable in mating fashion within the opening in the template and upon the central area of the base prior to removal of the template. First applications of selected resinous materials are provided within the mold enclosure and around an exterior circumference of the first sink bowl pattern. A plurality of elongate barrier members are positioned within the mold enclosure atop the first applications of resinous materials and in inwardly spaced and parallel extending fashion relative to associated sides of the mold enclosure. A suspending platform incorporating a second sink bowl defining pattern is capable of being set upon the base so that the second pattern is arrayed in spatial fashion above the first pattern. A second application of a selected resinous material fills an open interior established between the first sink bowl pattern and the second sink bowl pattern and a further application of resinous material fills a channel established between the barrier members and the associated sides of the base to create the built-up edge to the countertop.

12 Claims, 4 Drawing Sheets

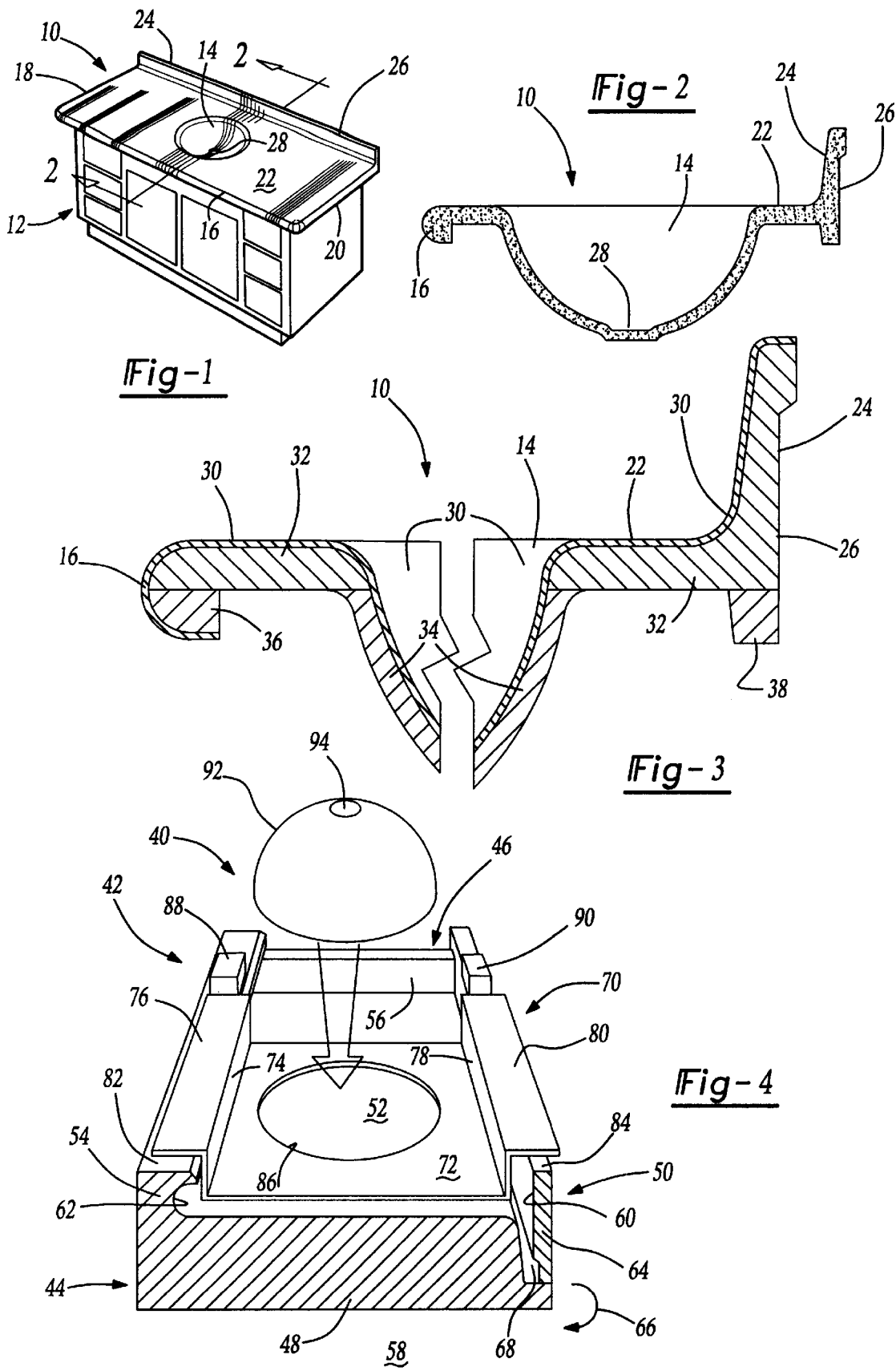

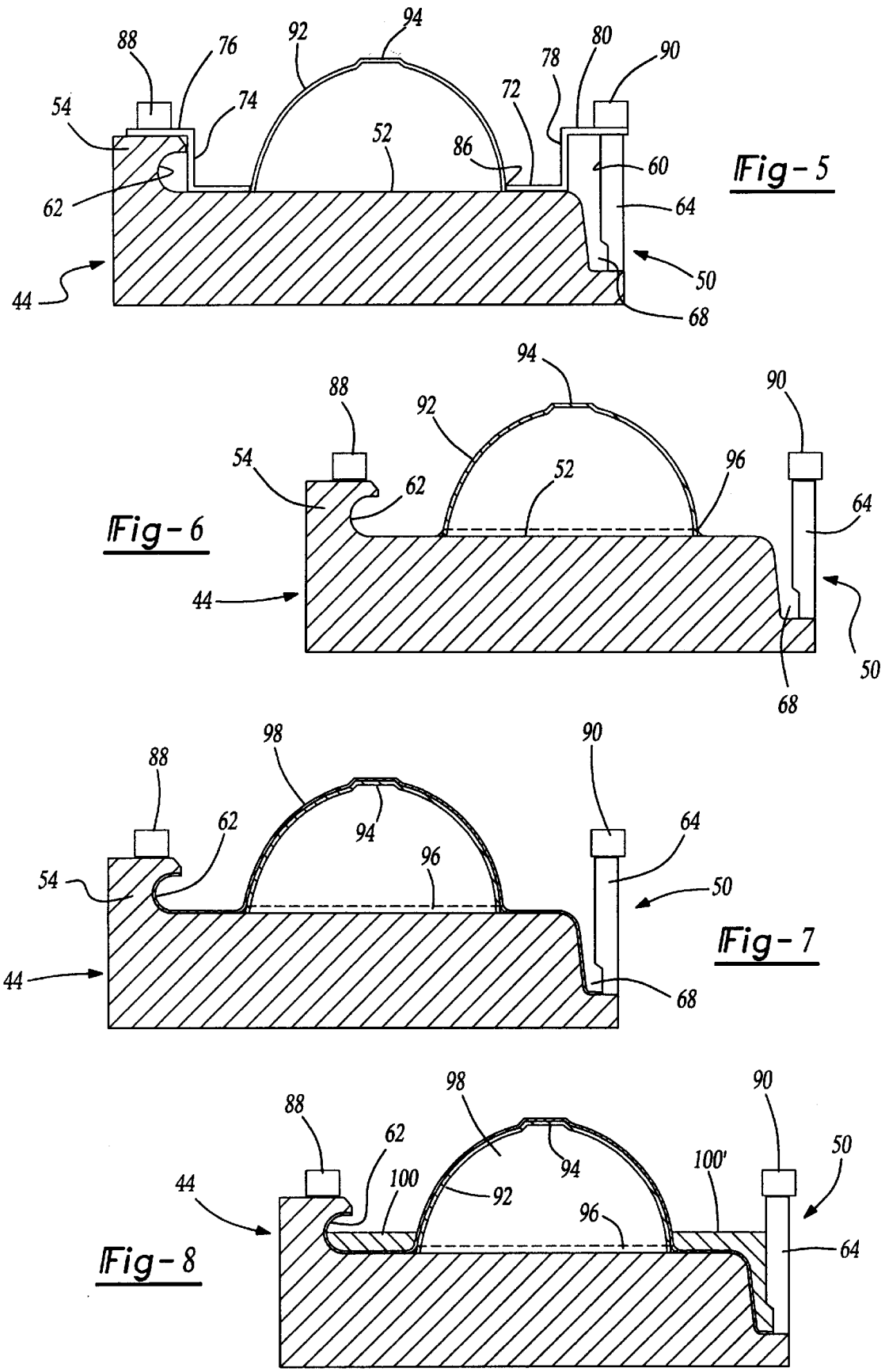

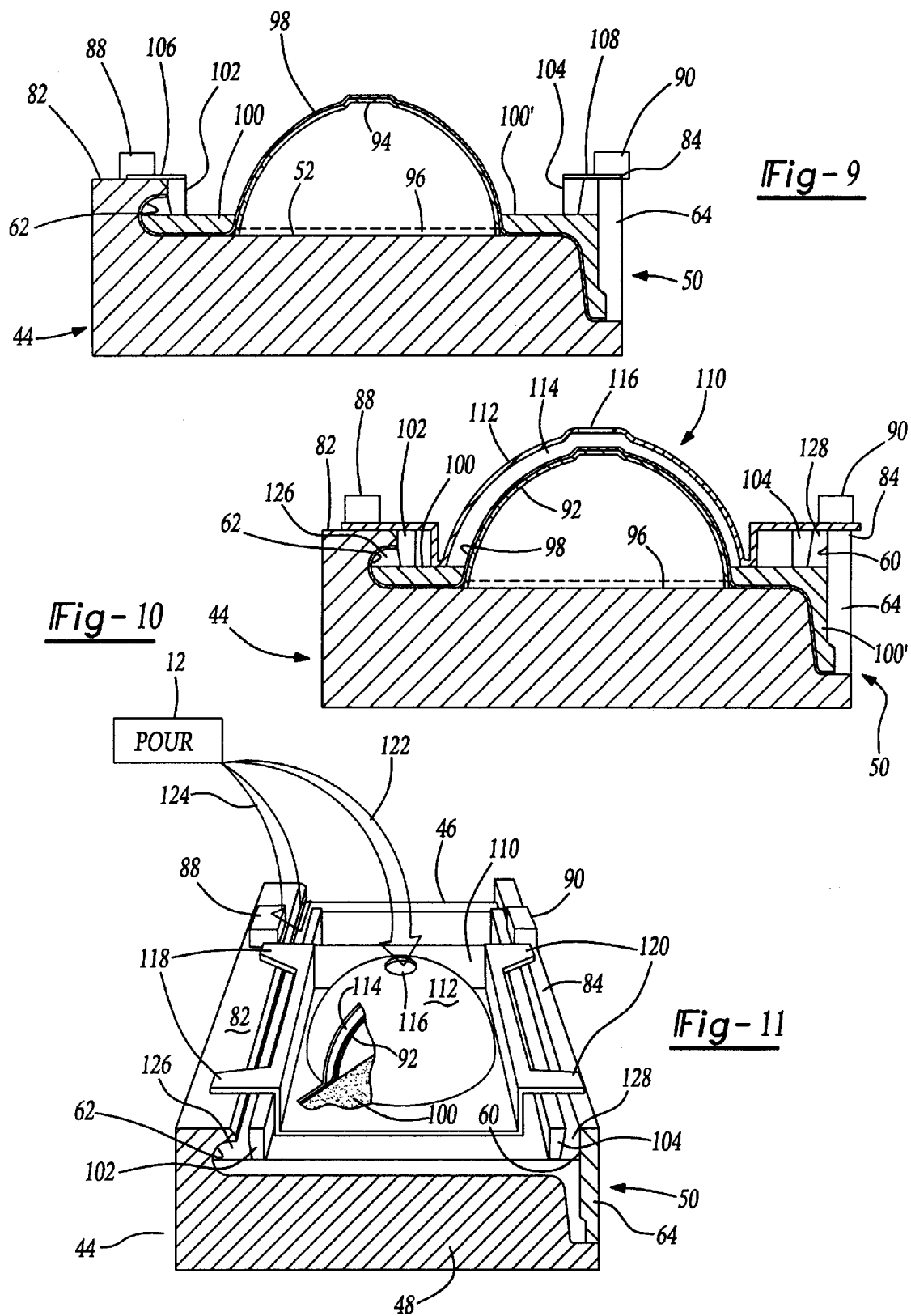

400
MOLD ASSEMBLY FOR PRODUCING A COUNTERTOP EXHIBITING AN INTEGRALLY FORMED SINK BOWL AND BUILT-UP EDGE AND METHOD FOR PRODUCING THE SAME

BACKGROUND OF THE INVENTION

1. Field of the Invention

The present invention relates generally to mold assemblies for producing countertop products such as veneer and conventional solid surface countertops and cultured marble countertops and the like and, more particularly, to a mold assembly for producing a countertop with an integrally formed sink bowl and also preferably exhibiting a built-up edge and a method for producing the same.

2. Description of the Prior Art

Mold assemblies and mold processes have recently become known in the art for producing a finished solid surface countertop which is constructed of various grades of a polyester resin or other similar resinous material. The objective of such more recent countertop mold assemblies is to make possible the creation of a solid surface countertop product in less time than has traditionally been possible with the use of prior art sheet-stock surfacing materials which of necessity must be cut and fabricated onto itself and other substrate materials, such as wooden backings, resulting in significantly higher material and labor costs.

An example of a fairly recent advancement in such mold technology is illustrated by U.S. Pat. No. 5,628,949, entitled Mold Process for Producing A Finished Solid Surface Countertop. The '949 patent teaches the provision of a smooth and horizontally disposed mold surface upon which are constructed a plurality of barriers, the edges of which are then filleted to define a mold enclosure which is a negative shape of a countertop product to be produced. A relatively thin coating of a high quality resinous spray is then applied evenly over the exposed area of the mold and a first pour of a relatively lower grade substrate resin material is then applied, such as by pouring, to backfill over the higher grade surface coating. After sufficient drying and curing, additional barriers are constructed usually on top of the gelled first pour in proximity to selected inwardly facing sides of the mold and a further pour of substrate material is effected to establish a built-up edge for the selected sides. The countertop is permitted to fully gel and cure for an additional selected period of time and is then removed from the mold for subsequent installation.

The technology disclosed by the '949 patent has further been determined to be useful in creating a similar resin based countertop product exhibiting a built-up edge along selected outwardly facing sides as well as an integrally formed sink bowl such as is desirable for bathroom countertops. The drawback heretofore has been the inability to produce, on a production basis, such countertop products which effectively utilize this technology.

SUMMARY OF THE PRESENT INVENTION

The present invention is a mold assembly and method for producing a resin based countertop having an integrally formed sink bowl and which is also capable of providing a built-up edge to selected sides of the countertop. The mold assembly includes an elongate and planar shaped base which is defined by a central surface area and a plurality of interconnecting and elevated sides to define an enclosure around the central area which is a negative shape of the countertop to be produced. The interconnecting and elevated sides can be flat in cross section but are usually inwardly bull-nosed so that the resultant built-up edge of the countertop exhibits an attractive and rounded appearance.

A template is settable upon the base and is movable in a selected longitudinal direction so that an opening formed in the template is positioned in overlaying fashion and at a desired location along the central area. A first sink bowl pattern is placed in mating fashion within the opening in the template and upon the central area of the base prior to removal of the template. At least one first application of a selected resinous material is applied within the mold enclosure and around an exterior circumference of the first sink bowl pattern and this first application usually consists of a spray coating of a first specified and typically high quality resinous material which is followed by a subsequently poured additional quantity of a second specified and typically lower grade resinous material which forms a substrate backing to the initial spray coating.

Following sufficient curing and gelling of the initial resinous material applications, a plurality of elongate barrier members which are preferably provided as a multi-sided divider member are positioned within the mold enclosure atop the substrate backing of material and in inwardly spaced and parallel extending fashion relative to associated sides of the mold enclosure. In a preferred embodiment, the elongate barrier members are interconnected to form a continuous divider bar and are placed in opposing arrangement with three selected sides of a four sided and elongate rectangular mold enclosure.

A suspending platform incorporating a second sink bowl defining pattern is set upon the base so that the second pattern is arrayed in spatial fashion above the first pattern. A second application of a selected resinous material, preferably through an opening formed in a central and uppermost portion of the second sink bowl defining pattern, fills an open interior established between the first and second sink bowl defining patterns to establish the sink bowl in integral fashion with the countertop. A further application of resinous material, again typically through pouring, fills a channel established between the elongate barrier members and the associated sides of the mold to create the desired built-up edge to the countertop.

According to the preferred embodiment, the fourth side of the mold enclosure is provided by a pivotally secured gate member and a reverse and downwardly extending recess is formed in inward proximity to the gate member and in extending fashion. The recess corresponds in configuration to an upwardly extending backsplash of the resultant countertop produced by the mold assembly.

A pair of first and second abutment blocks are releasably securable upon longitudinally extending and upwardly facing edge surfaces of the mold base which define opposite and elongate parallel extending sides of the mold. The first and second abutment blocks are indexable along the longitudinal range of the elongate mold base and, upon being established at a selected location, provide abutting stop to at least the template and preferably both the template and the subsequently arrayed suspending platform to guarantee perfect alignment. The advantage of the abutment blocks is to permit a user to quickly locate and array the first and second sink bowl patterns at a desired longitudinal location along the established central area of the mold enclosure to facilitate the creation of the integrally formed sink bowl portion of the countertop.

The mold process utilizes the above structure in sequentially arranged steps for creating a resin based countertop. A resin based countertop is also claimed according to the process steps as substantially recited in the process claims of the present invention.

BRIEF DESCRIPTION OF THE DRAWINGS

Reference will now be made to the attached drawings, when read in combination with the following specification, wherein like reference numerals refer to like parts throughout the several views, and in which:

FIG. 1 is a perspective view of a resin based countertop produced according to the assembly and process of the present invention in assembled fashion atop a cabinet;

FIG. 2 is a cutaway view taken along line 2—2 of countertop illustrated in FIG. 1 and showing the cross sectional profile of the countertop with integrally formed sink bowl, exposed built-up edges and rear facing backsplash according to the present invention;

FIG. 3 is an enlarged view similar to that shown in FIG. 2 and in partial cutaway which further illustrates the various applications of resinous materials for creating the countertop according to the present invention;

FIG. 4 is an initial perspective view of the elongate mold base, with a selected end side cut away for purposes of illustration, and which shows the template set upon the base in a longitudinally movable and located fashion for permitting application of the first sink bowl pattern upon the central area according to the present invention;

FIG. 5 is a side view of the mold shown in FIG. 4 and further illustrating both the template and first sink bowl pattern in place in an initial assembling step according to the present invention;

FIG. 6 is a view similar to FIG. 5 in a further assembling step and illustrating the template removed from the mold and an initial fillet application around an exterior circumference of the first sink bowl pattern in anticipation of an initial application of resinous material according to the present invention;

FIG. 7 is a view of a further assembling step in which a first spray of a resinous material is evenly coated upon the mold enclosure and around the circumference of the first sink bowl pattern according to the present invention;

FIG. 8 is a view of a further assembling step in which a subsequent application of a further resinous material is applied over the first spray coating to a selected thickness and around a bottom most perimeter edge of the first sink bowl pattern according to the present invention;

FIG. 9 is a view of a further assembling step in which the divider bar is positioned within the mold enclosure and so that the elongate barrier members which make up the divider bar are positioned in inwardly spaced and parallel extending fashion relative to associated sides of the mold enclosure according to the present invention;

FIG. 10 is a view of a further assembling step in which the suspending platform incorporating the second sink bowl pattern is set upon the base and so that the second pattern is arrayed in spatial fashion above the first sink bowl pattern according to the present invention;

FIG. 11 is a further perspective view similar to that shown in FIG. 4 and illustrating, in a further assembling step, the suspending platform positioned upon the mold and over the divider bar for subsequent applications of additional resinous material both within the open interior established between the first and second sink bowl patterns as well as the channel established between the divider bar barrier members and the associated and inwardly facing sides of the mold according to the present invention;

DETAILED DESCRIPTION OF THE PREFERRED EMBODIMENTS

Figure 12:
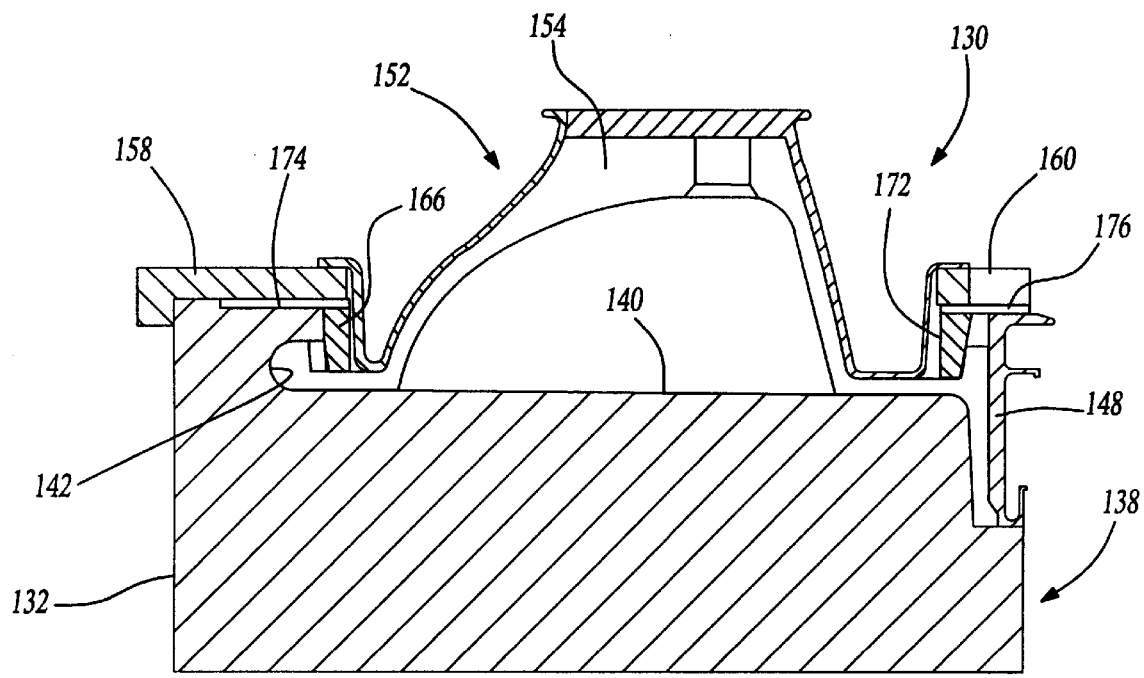
FIG. 12 is a side view similar to FIG. 10 and showing a cross sectional view in a cutaway illustrated along line 12—12 of FIG. 13 of a countertop exhibiting a differently configured sink bowl according to the present invention.

Referring now to FIG. 1, a resin based countertop is illustrated at 10 which is produced according to the mold assembly and process of the present invention. The countertop 10 is shown mounted atop a cabinet 12, such cabinet being known in the art and preferably being a bathroom cabinet which is provided with adequately dimensioned and upwardly facing recesses (not shown) for accommodating an integrally formed sink bowl 14 arranged at a longitudinally selected and generally centralized location of the countertop 10.

The countertop 10 in a preferred embodiment is shaped in an elongate and rectangular fashion and also displays a forwardly facing built-up edge 16. Additional side built-up edges at illustrated at 18 and 20, however it is understood that these edges can also be flat edged and according to a thickness consistent with a main central body 22 of the countertop as will be subsequently described.

Referring again to FIG. 1, as well as to FIG. 2, a backsplash 24 is illustrated both in perspective and in side cutaway which extends a running length of a fourth selected side 26 of the rectangular countertop 10. As will also be subsequently explained, the backsplash 24 is accounted for in the configuration of the mold assembly and provides an additional integrally formed component of the countertop 10 which establishes the present invention as a dramatic improvement over prior art mold assemblies and processes for creating similar resin based countertop constructions. A bottom-most drain configuration 28 is illustrated both in FIGS. 1 and 2 of the countertop 10 and is likewise accounted for in the geometry of the mold assembly and process of manufacture according to the present invention.

Referring to FIG. 3, an enlarged view of the countertop 10 similar to the illustration of FIG. 2 is likewise shown and identifies the various applications of resinous materials for creating the countertop 10 utilized in the mold assembly and process of manufacture according to the present invention. An initial and relatively thin coating of a resinous material is indicated at various locations as 30 and represents an initial application of material across the entire exterior facing surfaces of the countertop. The coating 30 is in the preferred embodiment a considered to be a quality surface resin coating and which, upon complete gelling and hardening, forms a durable and attractive exterior shell of the countertop 10.

A succeeding layer of a selected resinous material is illustrated at both forward and rearward locations of the main countertop body at 32 and represents a likewise single application of a suitable substrate backing material over the previously applied surface coating 30 and which also facilitates creation of the backsplash 24. A further succeeding layer of resinous material is identified at 34 and provides the configuration of the integrally formed sink bowl 14. A still further layer of resinous material is referenced at 36 and corresponds to the creation of the built-up edges, such as frontal edge 16, of the countertop 10. Finally, an additional optional application of resinous material may be provided at 38 to establish a reinforcing support along a rear underside of the fourth side 26 of the countertop 10. As will now be explained with reference to FIGS. 4–13 in sequence, the assembly and process of manufacture according to the present invention make possible the creation of the countertop product 10 in reduced set-up time, with less effort and with greater precision than has previously been possible.

Referring now to FIG. 4, an initial perspective/end view is shown at 40 of the mold assembly according to the present invention and illustrates an elongate rectangular mold base 42 having a first exterior side 44, a second side 46, a third side 48 and a fourth side 50. The third side 48, corresponding to an end side of the elongate base 42, is shown in cut-away for purposes of clarity of illustration and presentation of the structural features within the mold and which would otherwise be obscured if the enclosing structure of the third side 48 was illustrated. It is further understood that such enclosing structure for third side 48 would be identical to that illustrated for side 46 and reference is also made to the second preferred embodiment shown in FIG. 13 for additional support which illustrates in top view four interconnected and elevated sides defining a mold enclosure.

Referring again to FIG. 4, the elongate and rectangular shaped mold base 42 has defined therein a central surface area 52 which is bounded by a plurality of interconnecting and elevated sides. Each of the sides are inwardly facing towards the central surface area 52 and are illustrated as a first side 54 corresponding to first exterior side 44 of the mold base 42, a second side 56 corresponding to second exterior side 46, a third side 58 which is cut away but is illustrated representatively in FIG. 4 and is identical to second side 56 and, finally, by a fourth side 60. The four sides 54, 56, 58 and 60 define an enclosure around the central surface area 52 and selected sides, such as first side 54, also exhibit an inwardly bull-shaped configuration 62 which corresponds to the outwardly bull-shaped configuration of the built-up edge 16 of the countertop 10 illustrated in FIGS. 1–3.

As was previously suggested, the mold base 42 can provide additional inwardly facing sides, such as second side 56 and third side representatively illustrated at 58, for establishing second and third built-up edges (see built-up edges 18 and 20 in the countertop 10 of FIGS. 1 and 2). A desired countertop 10 to be produced can exhibit any number of built-up and preferably bull-nosed edges, but will preferably exhibit between one, two and three such edges for most home/bathroom applications. The fourth side 60 is provided by an elongate and planar shaped gate 64 which may further be pivotally secured to the mold base 42 so as to be pivotally disengaged in a direction indicated by arrow 66. A reverse and downwardly extending recess is illustrated at 68 which is formed along an inner side of the gate 64 and into the mold body along the length of the fourth side 60. The recess 68 corresponds in configuration to the backsplash 24 of the resultant countertop product 10.

Referring again to FIG. 4, a template 70 is provided and which includes a central body portion 72, a first locating portion having an upwardly extending member 74 and a successively outwardly extending member 76 and a second and opposite extending locating portion having an upwardly extending member 78 and a successively outwardly extending member 80. The outwardly extending members 76 and 80 of the template locating portions engage, respectively, atop first 82 and second 84 longitudinally extending and upwardly facing edge surfaces of the mold base 42, these surfaces 82 and 84 corresponding to the longitudinally extending first and fourth exterior sides 44 and 50 of the mold.

The template 70 is capable of being movable in a selected longitudinal direction so that an opening formed in the template 70, and defined by circular boundary 86, is positioned in overlaying and contacting fashion with the underlaying central area 52 of the mold base 42. Locating means are provided which are capable of being repositionably securable to the longitudinally extending and upwardly facing edge surfaces 82 and 84 and include a first abutment block 88 securable upon the first surface 82 and a second abutment block 90 securable upon the second surface 84. In a preferred variant, the longitudinal extending travel of the mold base is provided with some form of measurement or indexing means which permits the abutment blocks 88 and 90 to be quickly and correctly placed in aligning fashion upon the mold. The abutment blocks 88 and 90 function to provide an abutting stop to opposing edges of the outwardly extending members 76 and 80 of the template locating portions and to thereby quickly position the opening in the template 70 at the desired longitudinal location along the central surface area 52 of the mold base 42.

A first sink bowl pattern 92 is illustrated in elevated position above the template 72 in FIG. 4 and is matingly engaged in a downwardly settable fashion within the opening in the template 70 and in direct contact with the desired location of the central surface area 52. An uppermost configuration 94 is formed upon the first pattern 92 which corresponds to the drain configuration 28 of the countertop 10 previously illustrated.

Referring now to FIG. 5, a side view of the mold assembly is shown with the first sink bowl pattern 92 in mating engagement within the defined opening 86 of the template 72. Referring further to FIG. 6, the template 70 is removed from the mold after positioning of the first sink bowl pattern 92 at the desired location along the central surface area 52. In a further assembling step, a layer of a clay fillet material 96 is applied around a bottom edge circumference of the first pattern 92 and between the bottom edge and the upwardly facing surface area 52 in anticipation of an initial application of a resinous material.

Referring to FIG. 7, a first coating of a high grade resinous material is applied at 98 in a further assembling step evenly across all the exposed surfaces of the mold enclosure and the positioned first pattern 92. As is best viewed from the cross section of FIG. 6, the surface coating 98 extends from the front inwardly curved bull-nose 62 to the rear most and downwardly recessed corner of the aperture 68 which forms the backsplash of the countertop and this coating 98 corresponds to the surface coat identified at 30 for the countertop 10 illustrated in FIG. 3

Referring to FIG. 8, a further assembly step is shown and includes a backpour of a substrate resinous material, illustrated at 100 and 100' which completely fills the mold enclosure around the exterior circumference of the first sink bowl pattern 92, including the frontal and optional side built-up edges and the downwardly recessed aperture 68 for creating the backsplash. While not clearly evident from FIG. 8, it is understood that the resinous application 100 and 100' is preferably applied in a single pour step according to the present invention.

Referring to FIGS. 9, 10 and 11, a further assembly step is shown and includes a plurality of elongate barrier members, illustrated by a first barrier 102 and a second barrier 104, which are positionable within the mold enclosure atop the resinous substrate material 100 and 100' and in inwardly spaced and parallel extending fashion relative to associated sides, illustrated by front bull-nose edge 52 and rear gate 64, of the mold enclosure. In a first preferred variant as shown in FIG. 11, the elongated barrier members 102 and 104 may be individually installed and are capable of being set directly upon the substantially cured surfaces of the resinous applications 100 and 100'. Alternatively, and referring back to FIG. 9, the elongated barrier members 102 and 104 can be interconnected together into an overall divider bar assembly and supported in suspending fashion over the resinous application 100 and 100' by suspending portions 106 and 108 extending outwardly from the members 102 and 104, respectively, which are then supported atop selected upper surfaces of the mold body such as the first and second upwardly facing and longitudinally spaced apart edge surfaces 82 and 84. Reference is also made again to FIG. 13 of the further preferred embodiment which illustrates a four sided divider member and which indicates how four similar such members as shown at 102 and 104 in FIGS. 9–11 would be interconnected with additional members extending along the second and third selected sides 56 and 58 of the mold enclosure which are not illustrated due to the limitations in presentation of the initial preferred embodiment.

Referring again to FIGS. 10 and 11, a yet further assembly step includes positioning a suspending platform 110 incorporating a second sink bowl defining pattern 112 upon said mold base so that said second pattern 112 is arrayed in spatial fashion above said first sink bowl defining pattern 92 and defines an open interior 114 therebetween. An opening 116 is preferably formed at an uppermost and central portion of the second pattern 112 and the suspending platform 110 further includes a first pair of suspending members 118 and a second pair of oppositely extending suspending members 120 for suspending the platform 110 atop the first 82 and second 84 upwardly facing and longitudinally extending edge surfaces and so that the second pattern 112 is arrayed in desired fashion relative to the first pattern 92. The suspending platform 110 may also be constructed so that the abutment blocks 88 and 90 serve to likewise locate the platform 110 and second pattern 112 in addition to the template 70 and first pattern 92.

Subsequent applications of resinous materials are indicated schematically at 120 and include pouring additional volumes of suitable resinous material, preferably similar to the substrate material 100 and 100', into the mold. Specifically, a second application of a selected resinous material is provided at 122 by a volume of such material which is provided through the opening 116 to fill the open interior 114 between the sink bowl patterns 92 and 112. A further application is also provided at 124 for filling one or more channels established between the elongate barriers 102 and 104 and the associated and inwardly facing sides (62 and 60) of the mold and such channels are referenced at 126 and 128, respectively. Upon sufficient gelling and curing of the additional pours of material 122 and 124, the suspending platform 110 with second pattern 112 is removed along with the elongated barriers/divider bar. Upon curing of the countertop product sufficient to permit removal from the mold, the gate 64 is swung downwardly and the countertop product is demounted from within the mold.

Figure 13:
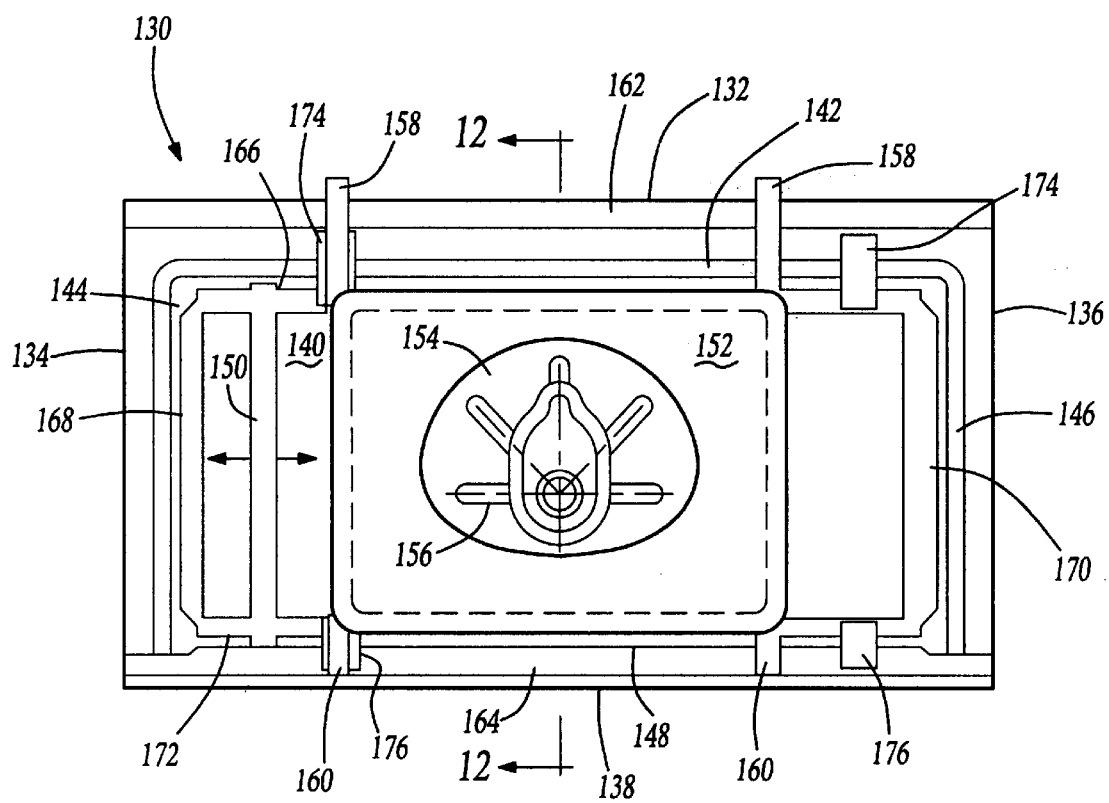
FIG. 13 is a top view of an enclosed mold assembly with divider bar and suspending platform arrayed within the defined mold enclosure for producing the countertop with integrally formed sink bowl and built-up edge according to the further preferred embodiment of the present invention.

Referring now to FIGS. 12 and 13, a further illustrated embodiment 130 is shown of a mold assembly for producing a resin based countertop according to the present invention. As is best illustrated by the overhead view of FIG. 13, the mold base includes four exterior sides 132, 134, 136 and 138 which define an enclosure around a central surface area 140. Interconnected and inwardly facing sides are provided for establishing the enclosure around the central area 140 and include a first inwardly curved and bull-nosed configuration 142 corresponding to a first 132 of the exterior sides, a second likewise bull-nosed configuration 144 corresponding to a second 134 of the sides, a third bull-nosed configuration 146 corresponding to a third 136 of the sides and, finally, a gate 148 corresponding to the fourth side 138.

An elongate subdividing member 150 (FIG. 13) is placeable within the mold enclosure at a selected longitudinal location between a first longitudinally extending and mold enclosing side (bull nosed edge 142) and a second opposite longitudinally extending and mold enclosing side (fourth edge defined by gate 148) and establishes an elongate and subset area from a total of the otherwise available central surface area. The subdividing member 150 is useful when used with standard width molds having a likewise standard longitudinal length and when it is desirable to produce a countertop product according to a shortened overall lengthwise dimension.

The initial template and first sink bowl pattern are not evident from the illustrations of FIGS. 12 and 13, however a variation 152 of the suspending platform is shown which includes a uniquely configured pattern 154 for creation of a sink bowl. The pattern 154 includes radially projecting reinforcements 156 which extend along associated underside surfaces of the countertop product and reinforceably support the countertop in an installed condition atop a suitable cabinet (see again FIG. 1). Pairs of suspending members 158 and 160 extend from opposite sides of the suspending platform 152 to array the platform upon upwardly facing and longitudinally extending support surfaces of the mold base 162 and 164, respectively.

The divider member is shown as a four-sided construction having a first interconnected side 166, a second interconnected side 168, a third interconnected side 170 and a fourth interconnected side 172, the four sides corresponding to the inwardly facing sides comprising the rectangular enclosure of the mold. A first pair 174 and a second pair 176 of suspending portions extend from the first divider member side 166 and the fourth divider member side 172, respectively, and function to support the divider member in the desired fashion within the mold enclosure and atop the initial substrate application of resinous material. The construction of the mold base and the assembly steps for creating the countertop product are otherwise as disclosed in the first preferred embodiment such that further explanation is not necessary.

A method for producing a resin based countertop having an integrally formed sink bowl and built up edge is also disclosed which utilizes the assembly steps as substantially described above. Such steps include at least establishing a mold base as described, locating a template upon the base and placing the first sink bowl pattern in mating arrangement within the opening formed within the template, removing the template and providing the at least one first application of a selected resinous material, positioning the suspending platform with second sink bowl defining pattern so that the second pattern is arrayed in spatial fashion above the first pattern, providing a second application of a further selected resinous material to fill the open interior between the patterns and removing the countertop product from the mold after it has sufficiently cured. Additional preferred process steps include the positioning of the plurality of elongate barrier members/divider bar within the mold enclosure in inwardly spaced and parallel extending fashion relative to the associated and inwardly facing sides of the mold and of pouring an additional volume of resinous material to fill at least one channel established between the barriers and the associated sides to create the built-up edge.

A countertop product produced by the novel process of the present invention is also claimed and may also include cultured marble, veneer solid surface resin and homogenous solid surface countertop products, such type of product currently being utilized in the marketplace.

Other additional preferred embodiments will further become apparent to those skilled in the art to which it pertains and without deviating from the scope of the appended claims.

I claim:

1. A mold assembly for producing a resin based countertop having an integrally formed sink bowl, said mold assembly comprising:

an elongate base having defined therein a central surface area, a plurality of interconnecting and elevated sides defining a mold enclosure around said central area which is a negative shape of the countertop to be produced;

template settable upon said elongate base and movable in a selected longitudinal direction so that an opening formed in said template is positioned in overlaying fashion at a desired location along said central area;

a first sink bowl pattern placeable in mating fashion within said opening in said template and upon said central area of said base prior to removal of said template;

a suspending platform incorporating a second sink bowl defining pattern capable of being set upon said base so that said second pattern is arrayed in spatial fashion above said first pattern; and at least one first application of a selected resinous material within said mold enclosure and around an exterior circumference of said first sink bowl pattern being followed by a second application of a selected resinous material to fill an open interior established between said first sink bowl pattern and said second sink bowl pattern.

2. The mold assembly as described in claim 1, further comprising a plurality of elongate barrier members which are positionable within said mold enclosure atop said at least one first application of resinous material and in inwardly spaced and parallel extending fashion relative to associated sides of said mold enclosure, a further application of a selected resinous material filling a channel established between said barriers members and said associated sides to create a built-up edge to the countertop.

3. The mold assembly as described in claim 2, said associated sides further comprising an inwardly bull-shaped configuration in cross section which corresponds to an outwardly bull-shaped configuration of the resultant countertop product produced by said mold assembly.

4. The mold assembly as described in claim 2, said base further comprising a rectangular elongate shape including first, second and third interconnected and elevated sides for establishing first, second and third built-up edges, a reverse and downwardly extending recess being formed inwardly thereof and along a fourth interconnected and elevated side of said mold enclosure and corresponding in configuration to an upwardly extending backsplash of the resultant countertop produced by said mold assembly.

5. The mold assembly as described in claim 4, said fourth interconnected and elevated side further comprising a pivotally secured gate, s aid ga te being pivotally disengaged after sufficient drying and curing of the countertop product to facilitate demounting thereof.

6. The mold assembly as described in claim 1, further comprising locating means releasably securable to said elongate base in indexable fashion and along said selected longitudinal direction for establishing a desired longitudinal location of said template .

7. The mold assembly as described in claim 6, said locating means further comprising a first abutment block being releasably securable upon a first longitudinally extending and upwardly facing edge surface of said base, a corresponding second abutment block being releasably in an identical longitudinal location to a second and opposite longitudinally extending and upwardly facing edge surface.

8. The mold assembly as described in claim 7, said template further comprising at least one first engaging member settable atop said first longitudinally extending and upwardly facing edge surface and at least one second engaging member settable atop said second and opposite longitudinally extending and upwardly facing edge surface.

9. The mold assembly as described in claim 8, said suspending platform further comprising at least one first suspending member settable atop said first longitudinally extending and upwardly facing edge surface and at least one second suspending member settable atop said second and opposite longitudinally extending and upwardly facing edge surface.

10. The mold assembly as described in claim 2, further comprising said plurality of elongate barrier members being interconnected in end-to-end fashion to define a multi-sided divider bar, suspending portions extending outwardly from said divider bar in opposite directions and being supported atop first and second upwardly facing and longitudinally spaced apart edge surfaces of said base to suspend said divider bar at a desired elevation above said central surface area which corresponds to a depth of said at least one first application of said resinous material.

11. The mold assembly as described in claim 2, further comprising an elongate subdividing member placeable within said mold enclosure at a selected longitudinal location between a first longitudinally extending side and a second opposite and longitudinally extending side of said base, said subdividing member establishing an elongate and subset area from a total of said central surface area.

12. The mold assembly as described in claim 1, said second sink bowl defining pattern further comprising an aperture formed in a centrally positioned and uppermost portion of said second defining pattern for receiving said second application of selected resinous material.

* * * * *

UNITED STATES PATENT AND TRADEMARK OFFICE
CERTIFICATE OF CORRECTION

PATENT NO. : 6,000,673
DATED : December 14, 1999
INVENTOR(S) : Robert Border

It is certified that error appears in the above-indentified patent and that said Letters Patent is hereby corrected as shown below:

Column 4, line 53 - Insert --,-- after "30" and delete "is".
Column 4, line 54 - Insert --,-- after "embodiment".
Column 4, line 54 - Replace "a" with --is-- (first occurrence).
Column 5, line 45 - Delete "and 2" after "Fig. 1".
Column 6, line 48 - Replace "6" with --7--.
Column 7, line 45 - Replace "120" with --121--.
Column 7, line 59 - Insert --102 and 104-- after "bar".

Signed and Sealed this

Twentieth Day of March, 2001

Attest:

NICHOLAS P. GODICI

*Attesting Officer*  *Acting Director of the United States Patent and Trademark Office*